(12) United States Patent
Burckart et al.

(10) Patent No.: US 9,001,981 B2
(45) Date of Patent: Apr. 7, 2015

(54) SYSTEM AND METHOD FOR VOICEMAIL INTERRUPTION

(75) Inventors: Erik J. Burckart, Raleigh, NC (US); Matthew J. Sheard, Morrisville, NC (US); Aaron K. Shook, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 2053 days.

(21) Appl. No.: 11/782,182

(22) Filed: Jul. 24, 2007

(65) Prior Publication Data

US 2009/0028304 A1 Jan. 29, 2009

(51) Int. Cl.
*H04M 1/64* (2006.01)
*H04M 3/533* (2006.01)
*H04M 3/428* (2006.01)

(52) U.S. Cl.
CPC ........ *H04M 3/53333* (2013.01); *H04M 3/4288* (2013.01)

(58) Field of Classification Search
CPC ... H04M 3/533; H04M 1/6506; H04M 3/537; H04W 4/12
USPC ............. 379/67.1, 88.18, 88.04, 88.22–88.25
See application file for complete search history.

(56) References Cited

U.S. PATENT DOCUMENTS

| | | | | |
|---|---|---|---|---|
| 5,651,054 | A * | 7/1997 | Dunn et al. | 379/88.11 |
| 6,014,436 | A * | 1/2000 | Florence et al. | 379/211.01 |
| 6,031,896 | A * | 2/2000 | Gardell et al. | 379/88.17 |
| 6,198,916 | B1 * | 3/2001 | Martin et al. | 455/413 |
| 6,639,972 | B1 * | 10/2003 | Cannon et al. | 379/88.18 |
| 2004/0258220 | A1 * | 12/2004 | Levine et al. | 379/88.23 |
| 2005/0152515 | A1 * | 7/2005 | Amir et al. | 379/88.13 |
| 2011/0026701 | A1 * | 2/2011 | Kirchhoff et al. | 379/207.13 |

* cited by examiner

*Primary Examiner* — Simon King
(74) *Attorney, Agent, or Firm* — Jordan IP Law, LLC

(57) ABSTRACT

The system of the present invention allows the recipient in a call to interrupt a voicemail message if the caller is still in the voicemail session with the recipient's voicemail box. The system has a Voicemail Session Monitor and an Interrupt Handler. In the method of the present invention, the voicemail connection is monitored by the recipient's phone and interrupted when the line is picked up, connecting the two parties if the calling party accepts the invitation. The receiving party is offered an invitation to accept the interrupt or to allow the calling user to stay in the voicemail system.

16 Claims, 3 Drawing Sheets

SYSTEM AND METHOD FOR VOICEMAIL INTERRUPTION

FIELD OF THE INVENTION

The present invention relates generally to telephony systems and voicemail messages and, more specifically, to a system and method for interrupting a voicemail during the time the voicemail is being left.

BACKGROUND OF THE INVENTION

Cellular phone providers set up voicemail so that after a certain number of rings, a call gets transferred directly to voicemail with no way for the original recipient to answer the call once the requisite number of rings has passed. Landline services have the same configuration. Everyone has experienced the frustration of fumbling with the phone in the pocket and barely missing the call or not knowing exactly where the handset is, knowing that the caller is now talking to voicemail. There is currently no way to pick up a call that is currently connected to a user's voicemail box in the cellular or landline services.

There presently is a need for a system and method for interrupting a voicemail while the voicemail session is active.

BRIEF SUMMARY OF THE INVENTION

The present invention is a system and method for interrupting a voicemail during the time the voicemail is being left.

The system of the present invention allows the recipient in a call to interrupt a voicemail message if the caller is still in the voicemail session with the recipient's voicemail box. The system has a Voicemail Session Monitor and an Interrupt Handler. In the method of the present invention, the voicemail connection is monitored by the recipient's phone and interrupted when the line is picked up, connecting the two parties if the calling party accepts the invitation. The receiving party is offered an invitation to accept the interrupt or to allow the calling user to stay in the voicemail system.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

The drawings are intended to depict only typical aspects of the invention, and therefore should not be considered as limiting the scope of the invention. In the drawings, like numbering represent like elements between the drawings.

DETAILED DESCRIPTION OF THE INVENTION

The present invention provides a system and method for interrupting a voicemail during the time the voicemail is being left.

Several terms have been assigned particular meanings within the context of this specification. A memory device is any device that contains addressable memory space that can be used to store and later retrieve digital data. A rank of memory devices is a collection of one or more devices addressable in parallel that, considered together, have a data path spanning the width of a data bus. A memory module is a removable memory unit carrying one or more ranks of memory devices. A memory unit can be a memory module, a rank of memory devices, or a single memory device, the unit being addressed together. A memory controller is a requesting device that has the capability to store/retrieve digital data to/from a memory unit using a bi-directional data bus. An address/command bus allows a memory controller to transmit requests to, e.g., read and write digital data to addressable locations in a memory unit's addressable memory space, the bus having the capability to serve more than one memory device or unit. A BIOS is a low-level operating system for a computer system, the BIOS generally defining the system hardware configuration and containing low-level software for initializing the computer system.

Figure 1:
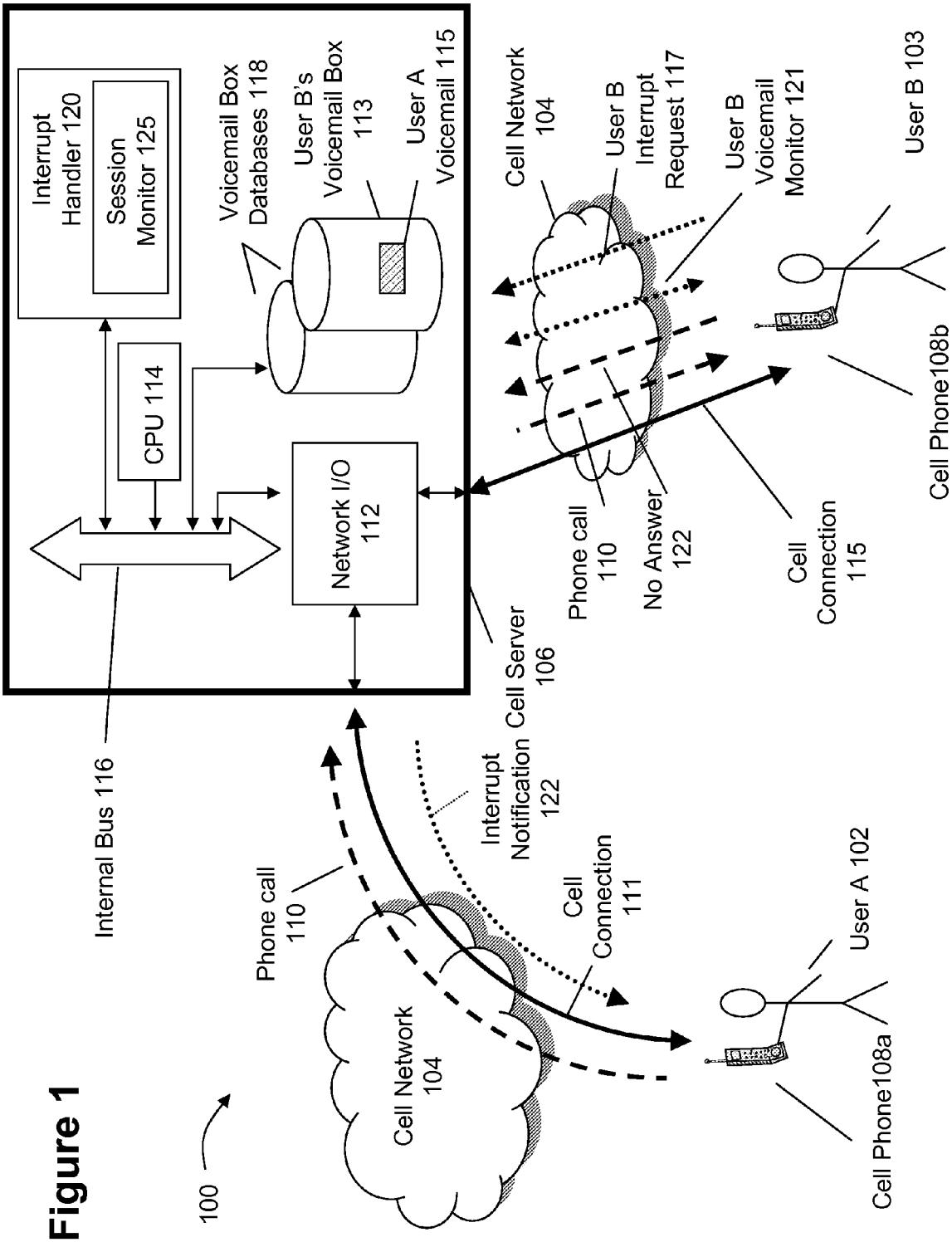
FIG. 1 depicts the system of the present invention.

The present invention works by introducing a method and a mechanism that allows the recipient of a call to monitor the status of that call after it has reached his or her voicemail. The feature of the present invention allows the recipient user to monitor the status of the caller's session with voicemail, giving the ability to see that the session is still connected, and more importantly, the ability to interrupt a session that is still in progress. This is shown in the system 100 in FIG. 1 where a first caller (User A 102) is making a cellular Phone Call 110 through Cell Network 104 to a second caller (User B 103). The Network 104 comprises at least one Cell Server 106 which has a CPU 114, a Network I/O 112, Voicemail Box Databases 118, and an Interrupt Handler 120 which has a Session Monitor 125. When User A 102 makes a phone call to User B 103 and User B 103 doesn't accept the phone call within the predetermined number of rings or buzzes (No Answer 122), the Cell Server 106 directs the User A 102 call to User B's Voicemail Box 113 so that User A 102 may leave a voice message (User A Voicemail 115) for User B 103. Generally, the voicemail box is a voice response unit (VRU) and is programmed to prompt the user via a voice response unit to leave a message.

Sometimes, however, User B 103 is available but, for some reason, cannot get to the cell phone in the prerequisite number of rings or buzzes. The present invention allows User B 103 to monitor the voicemail inputs (via User B Voicemail Monitor 121 in communication with Session Monitor 125) and to interrupt (by sending User B Interrupt Request 117 to Cell Server 106) the voicemail of User A 102 and start a conversation with User A 102. User B Interrupt Request 117 is handled by Interrupt Handler 120. User A, while in his voicemail session with the voicemail box, is notified (Interrupt Notification 122) that User B is available. User A has the ability to choose to accept the Interrupt Notification 122 or to continue to leave the Voicemail 115.

Figure 2:
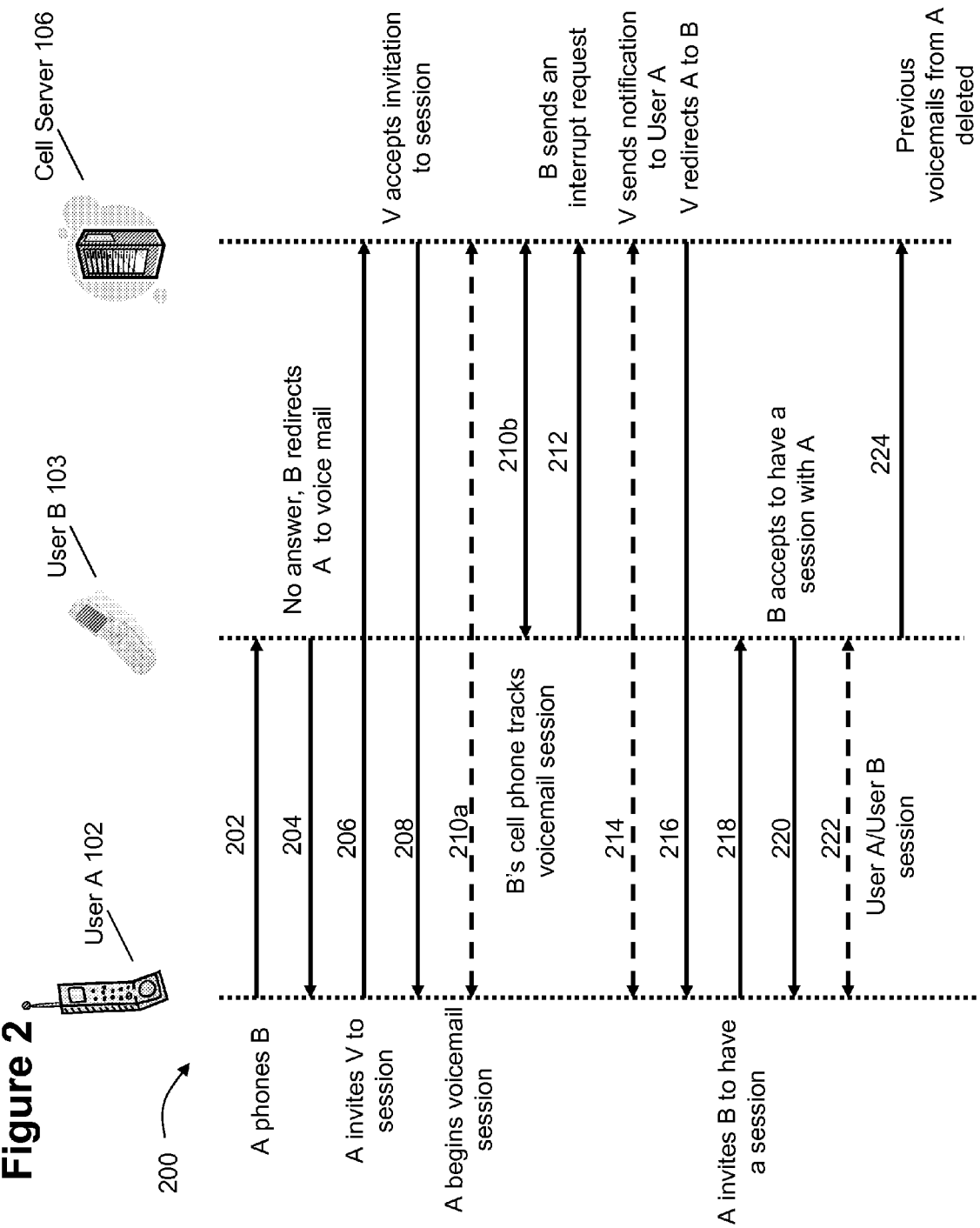
FIG. 2 shows the method of the present invention.

As shown in FIG. 2, the method 200 of present invention starts at Step 202 where User A places a call to User B but User B does not pick the phone in the predetermined number of rings or buzzes so that the phone call is directed to phone mail at 204. The number of rings or buzzes may be preset by the cell system or can be set by the user of the receiving cell phone. Because there was no answer, or acceptance of the phone call attempt, at User B's cell phone, at step 206, User A's phone invites the voicemail to have a session and, at 208, the voicemail (server) accepts the session which session begins at 210*a*. At 210*b*, although User B is unavailable, User B's cell phone tracks the voicemail session (User A is now leaving a voicemail message for User B's later retrieval). At 212, User B wishes to interrupt the voicemail session and begin a conversation with User A and sends an interrupt request to the Cell Server 106. The Cell Server 106, at step 214, sends a notification to User A and, once that has been accepted, the Cell Server 106 redirects User A to User B at 216. At 218, User A invites User B to have a session and, at 220, User B accepts the session. At Step 222, User A and User B have a conversation and, at step 224, the previous voicemails related to this conversation are deleted from the voicemail box.

Figure 3:
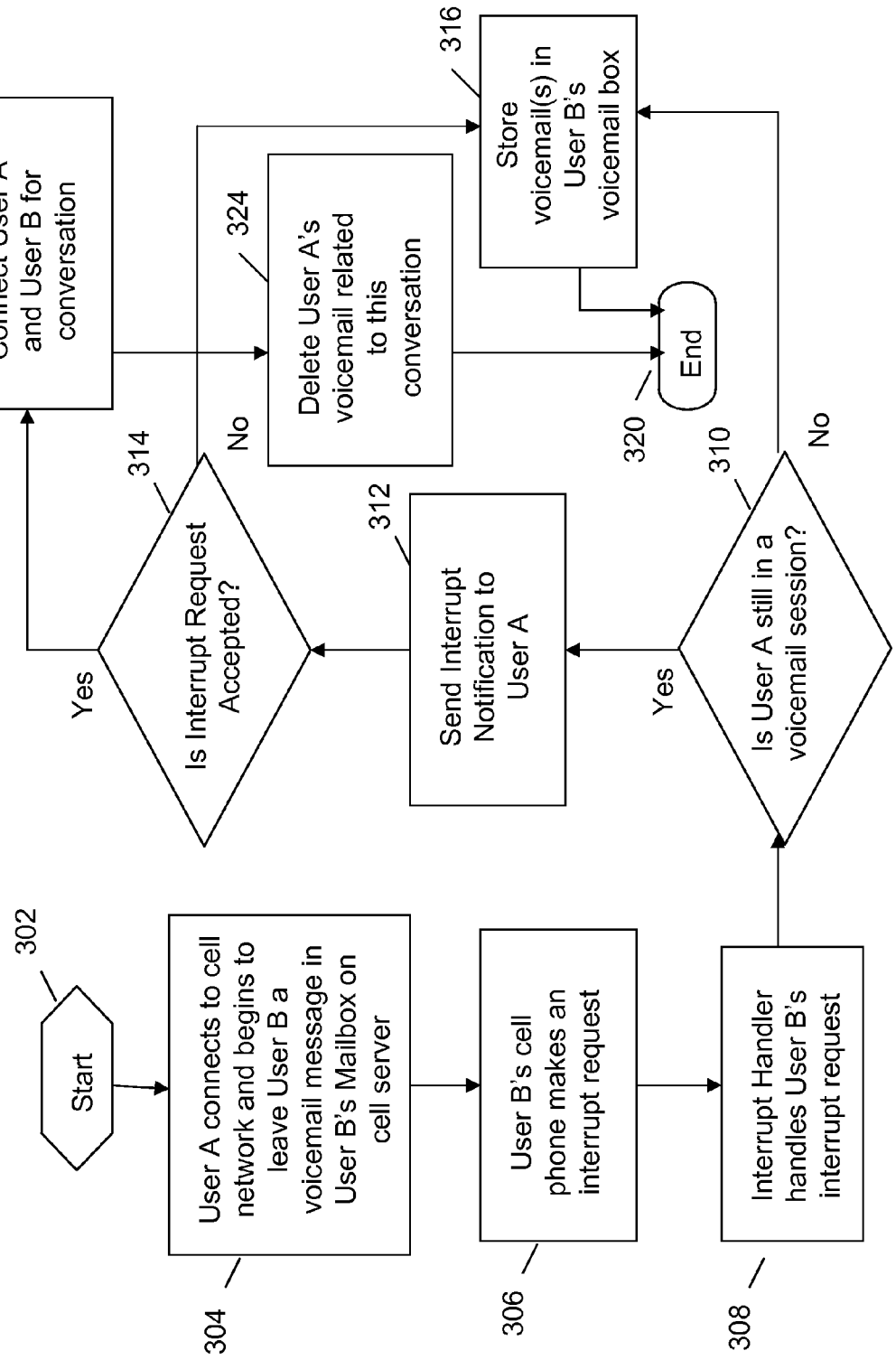
FIG. 3 illustrates the operation of the present invention.

FIG. 3 illustrates the method 300 of the present invention which starts at Step 302 and continues to Step 304 where User A connects to cell network and, when User B does not accept the phone call invitation within a predetermined number of rings or buzzes, User A is connected to User B's Voicemail Box on Cell Server 106 and begins to leave User B a voicemail message. User B's cell phone monitors this voicemail session. At some time later, User B is available and, at Step 306, User B, through User B's cell phone, makes an interrupt request to interrupt the voicemail message process so that User A and User B may have a conversation. At Step 308, the interrupt request is received by the Cell Server and Interrupt Handler handles User B's interrupt request. At Step 310, it is determined whether User A still in a voicemail session by querying the Session Monitor 125. If session has ended, User A's voicemail messages are stored for future review. If the session has not ended, an Interrupt Notification is sent to User A at step 312. At Step 314, it is determined whether User A has accepted the interrupt request. If not, User A's voicemail messages are stored for future review at 316. If so, at 322, User A and User B are connected for the intended conversation, the voicemails related to the conversation are deleted 324 and the process ends at 320.

The present invention provides a system and method for interrupting a voicemail during the time the voicemail is being left which allows a receiving user to interrupt a voicemail message being left on a system by another user. This provides the feel of a local voicemail (message) system where the receiving user can just pick up the telephone (go off-hook) to interrupt the sending user's voicemail and obtain a real-time conversation.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A voicemail system for interrupting a voicemail session between a first user and a voicemail box of a second user, the system comprising:

a network input/output device associated with a cellular network and configured to receive and send call-related information between the first user and the second user;

a voicemail box configured to receive and store a voicemail message associated with a cellular phone call from the first user to the second user, wherein the cellular phone call is to be initiated from a first cellular device associated with the first user to a second cellular device associated with the second user using the cellular network; and an interrupt handler configured to handle an interrupt request from the second cellular device to interrupt the voicemail session while the voicemail message is being received by the voicemail box of the second user, wherein the interrupt request is to be associated with a monitoring of the voicemail session between the first user and the voicemail box;

wherein the interrupt handler is configured to interrupt the voicemail session based on the interrupt request being received while the voicemail is being received by the voicemail box of the second user and is configured to issue an interrupt invitation to the first user, and wherein the first user is enabled to accept or not accept the interrupt invitation, and wherein based on the first user accepting the interrupt invitation, the second user is notified that the second user is being redirected to the first user and/or the first user is notified that the first user is being directed to the second user.

2. The voicemail system of claim 1, wherein, based on the first user accepting the interrupt invitation, the voicemail message is deleted.

3. The voicemail system of claim 1 wherein the interrupt handler further comprises a session monitor configured to monitor the voicemail session between the first user and the voicemail box.

4. A method for interrupting a voicemail message being left on a second user's voicemail box, when a first user is attempting to contact the second user, the method comprising:

receiving a phone call attempt from a first cellular device of the first user to a second cellular device of the second user via a cellular network;

determining that the second user has not accepted the phone call based on a predetermined factor;

redirecting the first user to a voicemail box of the second user;

establishing a voicemail session between the first user and the voicemail box of the second user;

receiving, from the second cellular device, an interrupt request associated with a monitoring of the voicemail session, while the voicemail session is active;

enabling the first user to have an option to accept or not accept the interrupt request; and based on whether the first user has accepted the interrupt request, connecting the first cellular phone and the second cellular phone to enable a conversation between the first user and the second user and automatically deleting the voicemail message from the first user to the second user.

5. The method of claim 4 further comprising:

providing a notification to the first user that the second user has issued an interrupt request.

6. The method of claim 4 wherein the redirecting the first user to the voicemail box of the second user comprises offering an invitation to the first user to have a voicemail session with the voicemail box.

7. The method of claim 4, wherein based on the first user accepting the interrupt request, the first cellular phone and the second cellular phone are connected in a conversation.

8. The method of claim 4, wherein based on the first user not accepting the interrupt request, the first user is enabled to continue leaving the voicemail message in the voicemail box.

9. The method of claim 4 further comprising:

based on the first user accepting the interrupt invitation, notifying the second user that the second user is being redirected to the first user.

10. The method of claim 4 further comprising:

based on the first user accepting the interrupt invitation, notifying the first user that the first user is being redirected to the second user.

11. A computer software program comprising program code stored on a non-transitory computer-readable medium, which when executed, enables a computer system to implement a method for interrupting a voicemail message being left on a second user's voicemail box, the method comprising:

receiving a phone call attempt from a first cellular device of the first user to a second cellular device of the second user via a cellular network;

determining that the second user has not accepted the phone call based on a predetermined factor;

redirecting the first user to the voicemail box of the second user;

establishing a voicemail session between the first user and the voicemail box of the second user;

receiving, from the second cellular device, an interrupt request associated with a monitoring of the voicemail session, while the voicemail session is active; and wherein the first user is enabled to accept or not accept the interrupt request, and wherein if the first user accepts the interrupt request, the first user and the second user are connected in a conversation via the cellular network and the voicemail message from the first user to the second user is automatically deleted.

12. The computer program product of claim 11 further comprises providing a notification to the first user that the second user has issued an interrupt request.

13. The computer program product of claim 11 wherein the redirecting the first user to the voicemail box of the second user comprises offering an invitation to the first user to have a voicemail session with the voicemail box.

14. The computer program product of claim 11 wherein if the first user does not accept the interrupt request, the first user is enabled to continue leaving a voicemail message in the voicemail box.

15. The computer program product of claim 11 wherein if the first user accepts the interrupt invitation, the second user is notified that the second user is being redirected to the first user.

16. The computer program product of claim 11 wherein if the first user accepts the interrupt invitation, the first user is notified that the first user is being redirected to the second user.

* * * * *